United States Patent
Kobayashi

[11] Patent Number: 5,659,380
[45] Date of Patent: Aug. 19, 1997

[54] BOLT AND ENGAGEMENT APERTURE LENS JOINT STRUCTURE FOR FRAMELESS SPECTACLES

[76] Inventor: Mitsuo Kobayashi, 6-9 Ebata-cho, Fukui-shi, Fukui-ken, Japan

[21] Appl. No.: 604,659

[22] Filed: Feb. 21, 1996

[51] Int. Cl.$^6$ .................... G02C 1/02; G02C 5/00
[52] U.S. Cl. .................... 351/110; 351/141
[58] Field of Search .................... 351/110, 111, 351/41, 153, 106, 86, 92, 141; 16/228

[56] References Cited

U.S. PATENT DOCUMENTS

| | | | |
|---|---|---|---|
| 4,502,765 | 3/1985 | Cooper | 351/110 |
| 5,412,440 | 5/1995 | Takeda et al. | 351/110 |

Primary Examiner—Hung X. Dang
Attorney, Agent, or Firm—Nikaido, Marmelstein, Murray & Oram LLP

[57] ABSTRACT

An improved joint structure of frameless spectacles for connecting a joint section of a temple or a bridge to an associated lens is described. In order to improve productivity requiring no soldering and to prevent causing no stress in the lens, a bolt is inserted in an engagement aperture of the joint section of the temple or bridge, and in an engagement aperture made in the temple-to-lens or bridge-to-lens jointing area of the lens to be tightened by an associated nut. The engagement apertures and the bolt having such a shape that relative rotation may be prevented between the joint section, the lens and the bolt.

9 Claims, 8 Drawing Sheets

BOLT AND ENGAGEMENT APERTURE LENS JOINT STRUCTURE FOR FRAMELESS SPECTACLES

BACKGROUND OF THE INVENTION

1. Field of the Invention

The present invention relates to a lens joint structure for frameless spectacles, particularly appropriate both for connecting a temple to each lens and for connecting a bridge to the lenses arranged side by side.

2. Description of Related Art

A conventional lens joint structure for frameless spectacles, particularly a temple-to-lens joint for connecting a temple to the outer edge of each lens and a bridge-to-lens joint for connecting a bridge to the inner edge of each lens are shown in FIGS. 16 and 17.

An abutting piece "b" is curved to fit on a selected part of the lens circumference "a", and is soldered to a joint body "c". Also, the abutting piece "b" is soldered to a joint piece "e", which has a through hole "d" at its end. The temple-to-lens joint or bridge-to-lens joint thus made by soldering is attached to the lens by applying the abutting piece "b" to the selected part of the lens circumference "a"; putting the through hole "d" of the joint piece "e" in alignment with an associated through hole "f" of the lens; and by inserting a bolt or screw "g" in these through holes to be tightened by driving the thread "h" of the screw "g" in an associated nut "i" on the other side of the lens.

As may be understood from the above, the conventional lens joint structure has a plurality of small pieces soldered, and therefore, a corresponding number of soldering steps are required in producing lens joints. This is a cause for lowering the productivity of frameless spectacles. Also, there is a fear that soldered parts of frameless spectacles are damaged or separated when the temples are inadvertently opened too wide.

In adjusting the degree at which the temples are opened with respect to the lenses, the joints are subjected to controlled bending, which, however, localizes stress strong enough to cause breaks or cracks in such localized parts of the lens.

SUMMARY OF THE INVENTION

One object of the present invention is to provide an improved lens joint structure for frameless spectacles, which lens joint structure is guaranteed free of the defects described above in connection with the conventional lens joint structure.

To attain this and other objects according to the present invention, a lens joint structure for connecting the joint section of a temple or a bridge to an associated lens of frameless spectacles is improved in that a bolt is inserted in an engagement aperture of the joint section of the temple or bridge, and in an engagement aperture made in the temple-to-lens or bridge-to-lens jointing area of the lens to be tightened by an associated nut, the engagement apertures and the bolt having such a shape that relative rotation may be prevented between the joint section, the lens and the bolt.

Specifically, the engagement apertures may have a square or rectangular shape, and the bolt may have a head and a shank integrally connected to the head, at least the part of the shank extending in the engagement apertures of the joint section and lens having the same square or rectangular shape as these engagement apertures, and the remaining part of the shank having thread to engage with the nut on the side of the lens opposite to the side from which the bolt is inserted for fastening the joint section to the lens.

In addition, a resin, square or rectangular hollow plug may be press-fitted in the square or rectangular engagement aperture of the lens, and then, the square or rectangular part of the shank of the bolt is inserted in the resin square or rectangular hollow plug from one side of the lens. The thread of the shank of the bolt appearing on the other side of the lens is threadedly engaged with, and tightened by the nut for fastening the joint section to the lens.

Alternatively, the joint section may have a shank integrally connected thereto, at least the part of the shank extending in a square or rectangular engagement aperture made in the temple-to-lens or bridge-to-lens jointing area of the lens having the same square or rectangular shape as the engagement aperture of the lens, and the remaining part of the shank having thread to engage with an associated nut on the side of the lens opposite to the side from which the shank of the joint section is inserted for fastening the joint section to the lens. In this alternative, a resin square or rectangular hollow plug may be press-fitted in the square or rectangular engagement aperture of the lens. Then, the square or rectangular part of the shank of the joint section is inserted in the resin square or rectangular hollow plug from one side of the lens, and the thread of the shank of the joint section appearing on the other side of the lens is threadedly engaged with the nut for fastening the joint section to the lens.

The engagement aperture of the lens may be circular, and a resin circular hollow plug may be press-fitted in the circular engagement aperture of the lens. In spite of using the circular hollow plug in the circular engagement aperture of the lens, the engagement aperture of the joint section may be square or rectangular, and at least the part of the shank of a headed bolt extending in the square or rectangular engagement aperture of the joint section and the circular engagement aperture of the lens may have the same square or rectangular shape as the engagement aperture of the joint section, and the remaining part of the shank may have thread to engage with the nut on the side of the lens opposite to the side from which the bolt is inserted for fastening the joint section to the lens. The press-fitting of the square or rectangular part of the bolt into the circular plug causes the circular plug to be yieldingly deformed by allowing the corners of the square or rectangular shape of the shank of the bolt to invade the inner surface of the circular plug.

The head of the bolt may have a transverse ridge extending thereacross or a pointing mark close to its circumference. Alternatively, an engagement aperture of the lens may be circular, and a soft resin circular hollow plug may be press-fitted in the circular engagement aperture of the lens. The joint section may have a shank integrally connected thereto, at least the part of the shank extending in the circular engagement aperture of the lens having a square or rectangular shape, and the remaining part of the shank having thread to engage with an associated nut.

With these arrangements the bolt fixed to the joint section of a temple or bridge cannot rotate in the engagement aperture of the lens, and therefore, the lens is prevented from cracking at the temple-to-lens or bridge-to-lens jointing area of the lens. Also, the assembling of the such parts to frameless spectacles is facilitated. Use of joint sections having a bolt integrally connected thereto is still advantageous to assembling work, and accordingly the assembling efficiency can be improved.

Use of resin square or rectangular plugs has the effect of positively preventing the lens circumference from cracking.

Also, use of resin cylindrical plugs has the effect of: positively preventing the lens circumference from cracking; and integrating the square bolt to the lens via the intervening resin plug, which is deformed by allowing the corners of the square bolt to invade the inner circumference of the resin cylinder, accordingly increasing the friction between the outer circumference of the cylinder plug and the inner circumference of the engagement aperture of the lens.

When a square bolt having a transverse ridge or pointing mark on its head is inserted in the round plug, the correct orientation of the joint section of a temple or bridge can be assured by inserting the square bolt with its transverse ridge put vertical or with its pointing mark put down.

Other objects and advantages of the present invention will be understood from the following description of preferred embodiments of the present invention, which are shown in accompanying drawings.

DESCRIPTION OF THE PREFERRED EMBODIMENTS

First Embodiment

Figure 1:
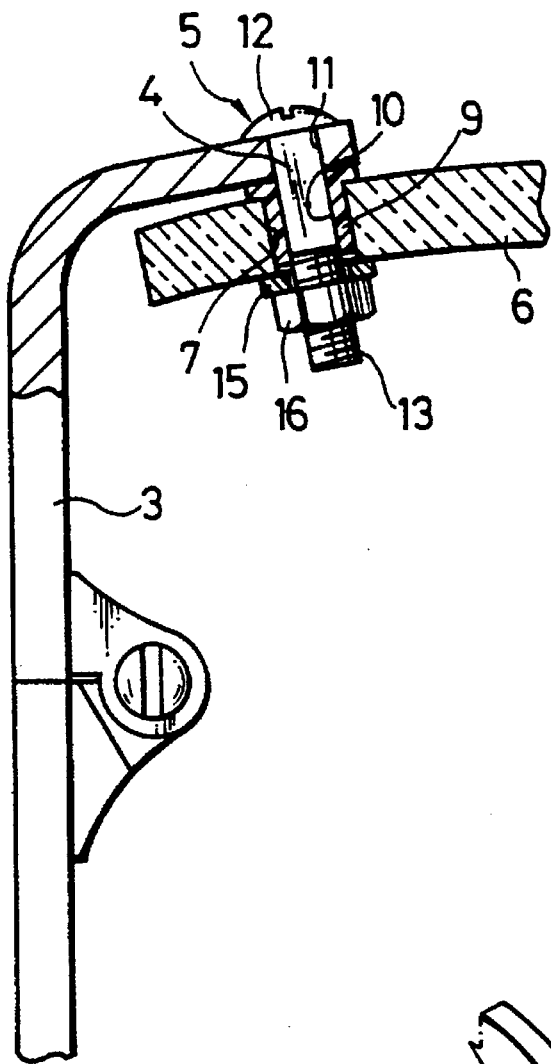
FIG. 1 shows, in section, a lens joint structure according to one embodiment of the present invention used as a temple-to-lens joint.
Figure 2:
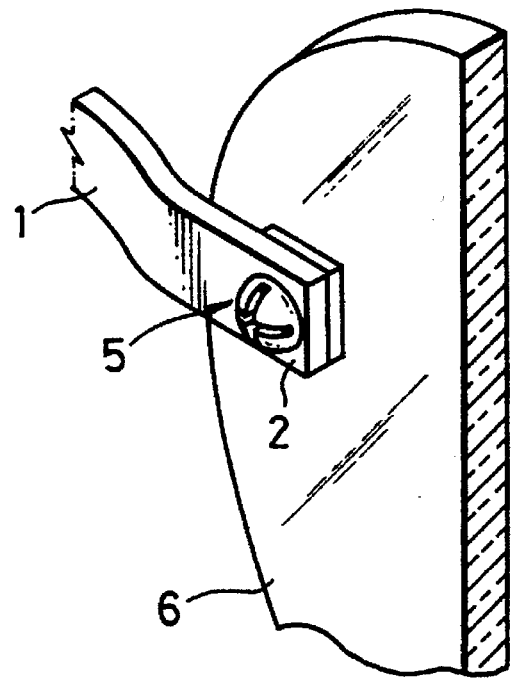
FIG. 2 is a perspective view of same lens joint structure used as a bridge-to-lens joint.
Figure 3:
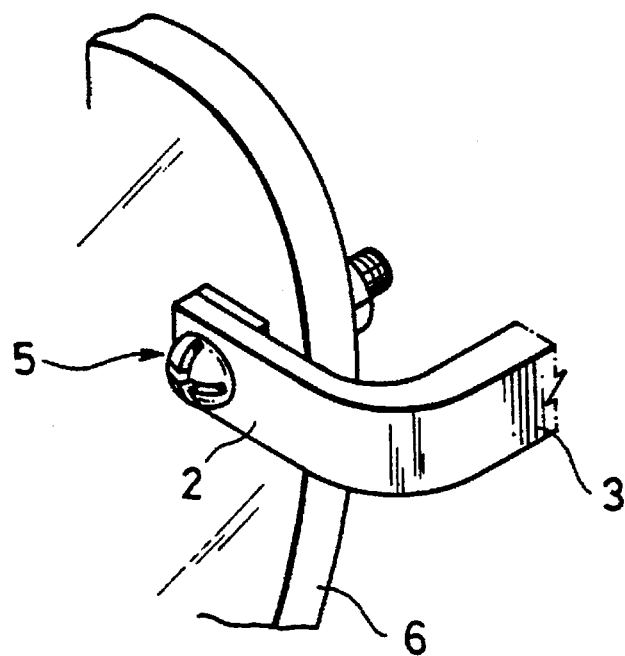
FIG. 3 is a perspective view of same lens joint structure used as a temple-to-lens joint.

Referring to FIGS. 1 to 4, a lens joint structure according to a first embodiment of the present invention can be used as a temple-to-lens joint (FIG. 3) or a bridge-to-lens joint (FIG. 2) by connecting the joint section 2 of a temple 3 to a lens 6 by a square bolt 5 (FIG. 3) or by connecting the joint section 2 of a bridge 1 to a lens 6 by a square bolt 5 (FIG. 2). The lens joint structure according to the first embodiment is described below as being used as a temple-to-lens joint.

Figure 4:
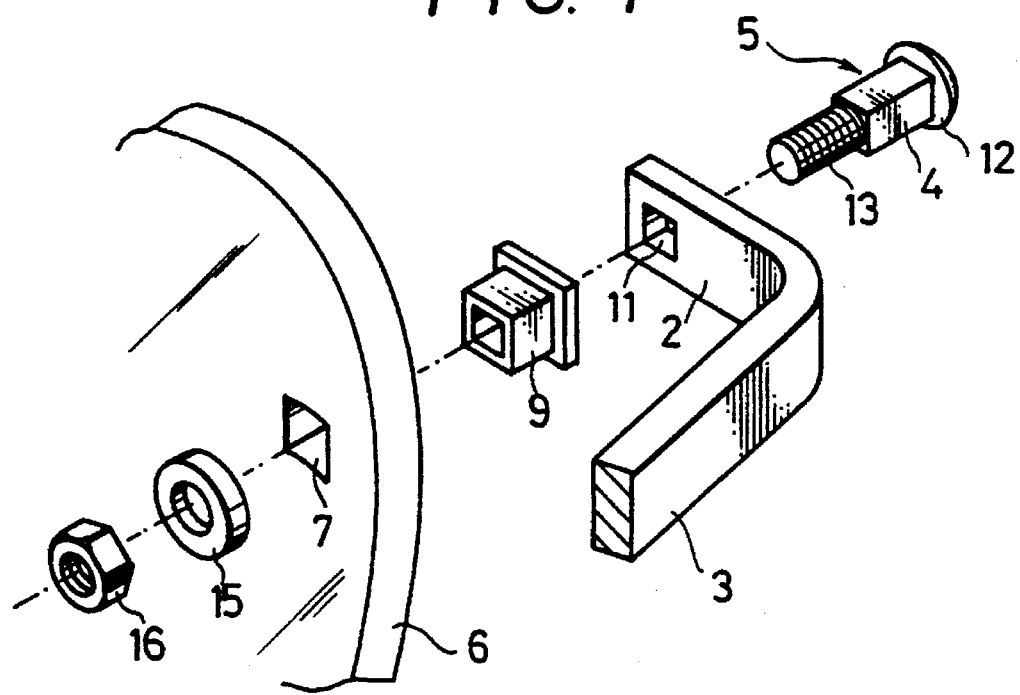
FIG. 4 is a perspective, exploded view of the lens joint structure.

Referring to FIG. 4, the lens 6 has a square engagement aperture 7 made in its temple-to-lens jointing area. A resin square plug 9 is press-fitted in the square engagement aperture 7 of the lens 6 to provide a square hole 10. Also, the joint section 2 has a square aperture aligned with the square hole 10 of the square plug 9. The bolt 5 comprises a head 12 and a shank integrally connected thereto, and the shank has a square part 4 and male-threaded part 13.

As seen from FIG. 1, the square bolt 5 is inserted from one side of the lens 6 in the square aperture 11 of the joint section 2 of the temple 3 and the square aperture 10 of the square plug 9, and the male-threaded part 13 of the bolt 5 appearing on the other side is threadedly engaged with an associated nut 16 via a washer 15. When the bolt 5 is tightened by rotating the nut 16 about it, the joint section 2 can be connected to the lens 6 without permitting the joint section 2 from rotating relative to the lens 6.

Figure 5:
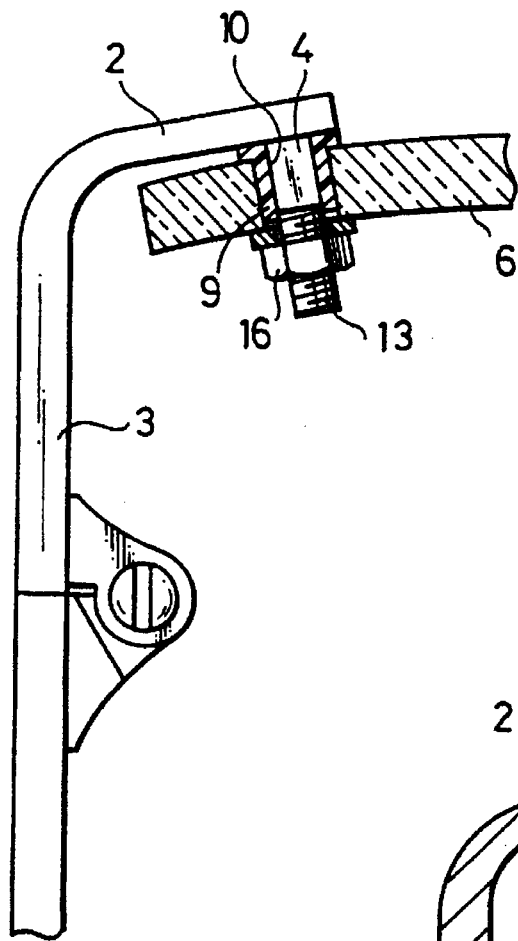
FIG. 5 shows, in section, a lens joint structure according to another embodiment of the present invention used as a temple-to-lens joint.

Alternately the joint section 2 of the temple 3 may have a square-and-thread shank 4 and 13 integrally connected to its inside end, as seen from FIG. 5. The square part 4 of the square-and-thread shank is inserted in the square hole 10 of the square plug 9 from one side of the lens 6, and the thread part 13 of the square-and-thread shank appearing from the other side of the lens 6 is threadedly engaged with the nut 16 to be tightened by rotating it about the thread part 13. The square-and-thread shank can be integrally connected to the inside end of the joint section 2 of the temple 3 by: forming the joint section 2 and the shank as a whole; soldering the square part 4 of the shank to the joint section 2; or press-fitting the square part 4 of the shank to a recess or aperture made in the joint section 2.

In case that the lens is made of a crack-resistive material, the square part of the shank may be inserted directly in the engagement hole of the lens without the square plug intervening between the shank and the lens.

Second Embodiment

Figure 6:
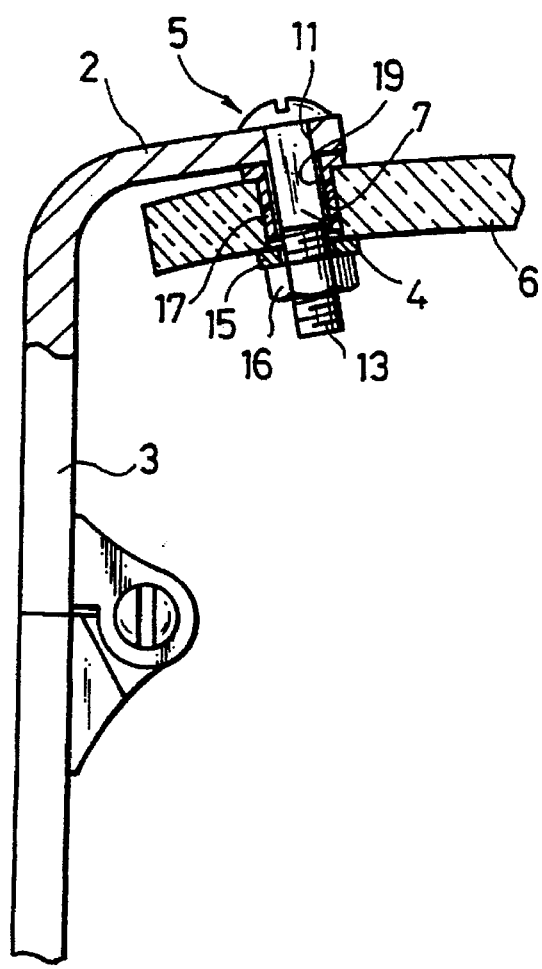
FIG. 6 shows, in section, a lens joint structure according to still another embodiment of the present invention used as a temple-to-lens joint.
Figure 7:
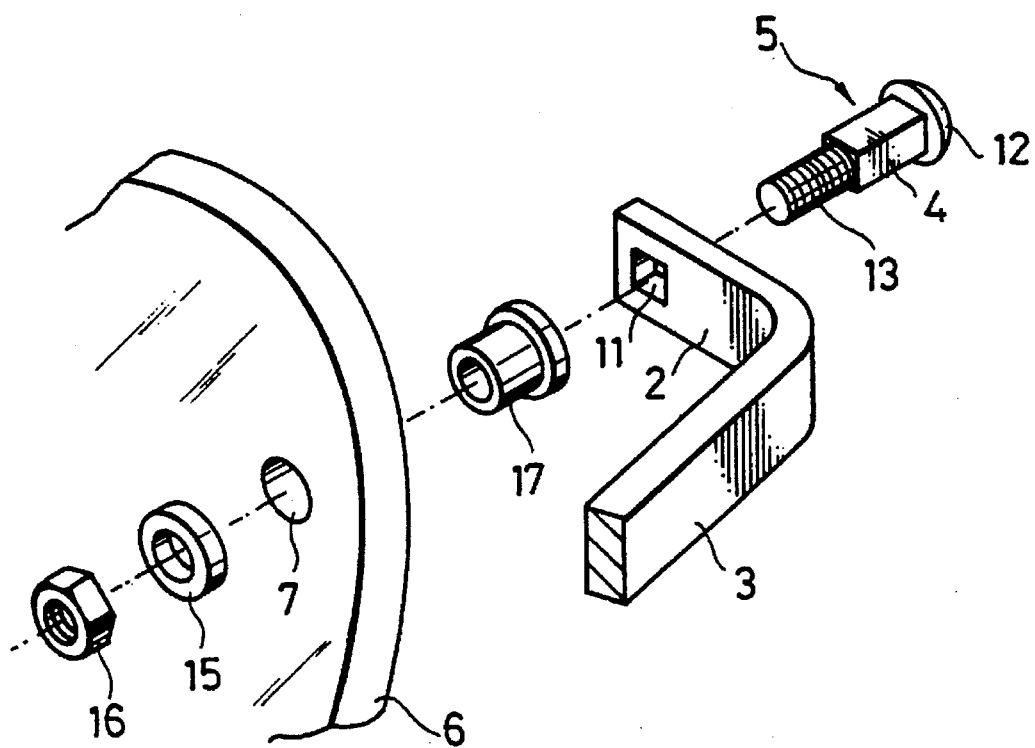
FIG. 7 is a perspective, exploded view of the lens joint structure of FIG. 6.

Referring to FIGS. 6 to 7, a lens joint structure according to a second embodiment of the present invention is described. A circular engagement hole 7 is made in the temple-to-lens jointing area of the lens 6, and a circular cylinder plug 17 of a soft synthetic resin such as nylon is press-fitted in the circular engagement hole 7. A square hole 11 is made in the end of the joint section 2 so as to be in alignment with the circular hole 19 of the cylindrical plug 17, which is fitted in the circular engagement hole 7 of the lens 6. A headed bolt 5 has a square part 4 integrally connected to its head 12 and a thread part 13 integrally connected to the square part 4, as shown in FIG. 7. The bolt 5 is inserted in the square hole 11 and the circular hole 19 from one side of the lens 6. The square part 4 of the bolt 5 is closely fitted in the square hole 11 of the joint section 2.

Figure 8:
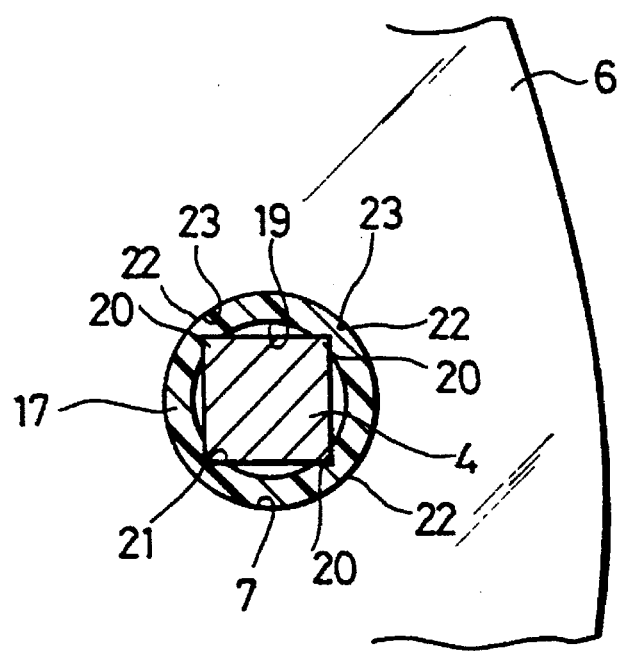
FIG. 8 is a cross-section showing how the cylindrical plug is deformed by the square bolt in the lens joint structure of FIG. 6.

The corners 20 of the square part 4, however, pushes the surrounding cylindrical wall until it is yieldingly withdrawn, thereby allowing the corners 20 of the square part 4 to invade the cylindrical plug 17, as shown in FIG. 8. The thread part 13 of the bolt 5 appearing on the other side of the lens 6 is threadedly engaged with the nut 16 via the washer 15. When the bolt 5 is tightened by rotating the nut 16 about the bolt 5, the joint section 2 can be connected to the lens 6, preventing the joint section 2 from rotating relative to the lens 6 by the square-to-square engagement at the bolt-to-joint section connecting area, and by square-to-circular engagement at the bolt-to-lens connecting area, which square-to-circular engagement is caused by the friction between the plug 17 and the lens 6. Such friction is increased to the extremity by forcedly invading the square part 4 of the bolt 5 into the surrounding circular thickness of plug 17.

Figure 9:
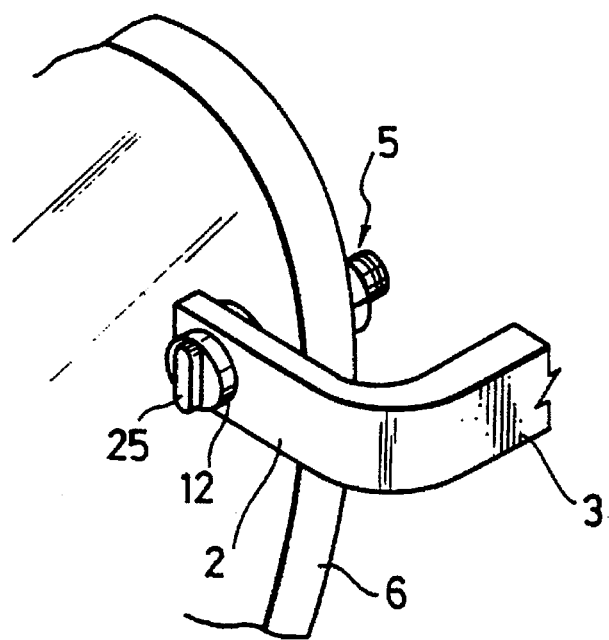
FIG. 9 is a perspective view of a lens joint structure using a bolt whose head has a transverse ridge thereacross as an orientation pointer.
Figure 10:
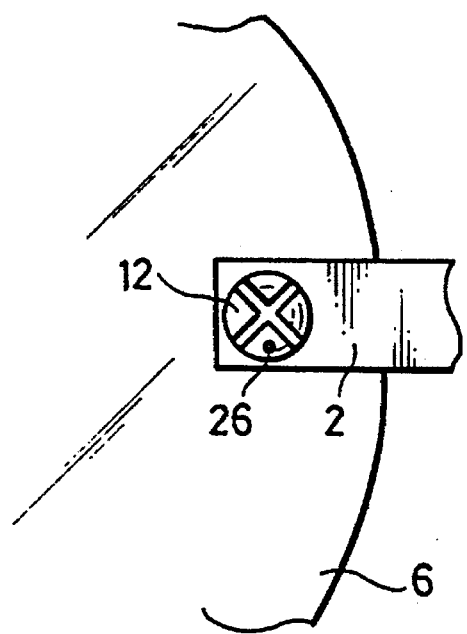
FIG. 10 is a perspective view of a lens joint structure using a bolt whose head has an orientation mark.

A square bolt which is to be inserted into a circular hole such as shown at 19 may be have a transverse ridge 25 across its head 12 (FIG. 9) or a pointing mark 26 close to the head circumference. The correct orientation of the temple 3 relative to the lens 6 is assured by inserting the bolt 5 with its transverse ridge 25 put vertical or with its pointing mark 26 put down.

Figure 11:
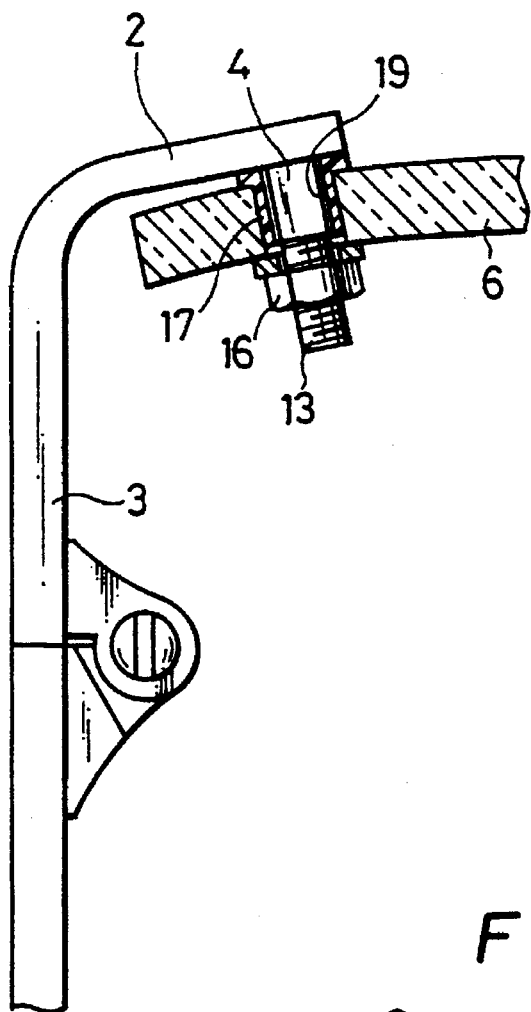
FIG. 11 shows, in section, a lens joint structure according to still another embodiment of the present invention used as a temple-to-lens joint.

Referring to FIG. 11, a joint section 2 may have a square-and-thread shank 4 and 13 integrally connected to its inside end, and the square part 4 of the square-and-thread shank is inserted in the circular hole 19 from one side of the lens 6. The square part 4 of the shank invades the surrounding circular thickness of the plug 17. The thread part 13 of the shank appearing on the other side of the lens 6 is threadedly engaged with the nut 16 via the washer. When the shank is tightened by rotating the nut 16 about the bolt, the joint section 2 is of the temple 3 can be fixed to the lens 6. The square-and-thread shank may be integrally connected to the inside end of the joint section 2 by forming the joint section 2 and the shank as a whole, soldering the square part 4 of the shank to the joint section 2 or press-fitting the square part 4 of the shank to a recess or aperture made in the joint section 2.

Figure 12:
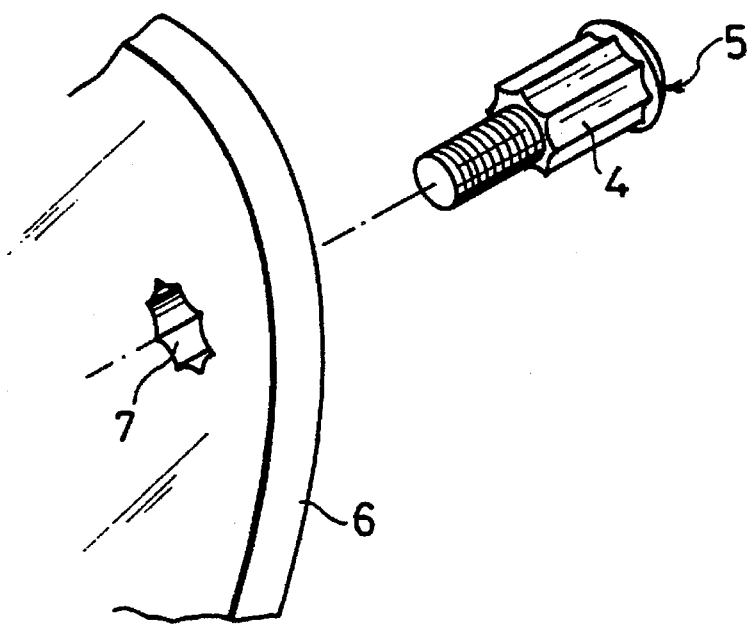
FIG. 12 is a perspective view of a polygonal bolt and a polygonal engagement aperture made in the temple-to-lens or bridge-to-lens jointing area of the lens.
Figure 13:
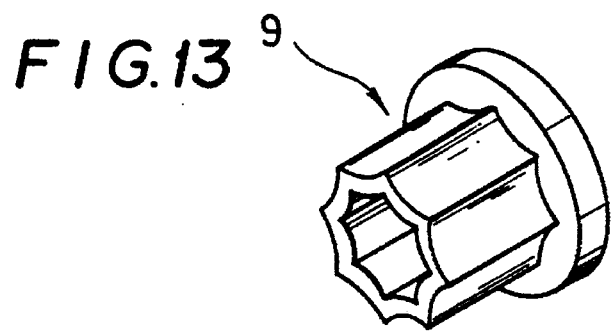
FIG. 13 is a perspective view of a resin polygonal plug to be press-fitted in the polygonal engagement aperture of FIG. 12.

The engagement aperture which is made in the temple-to-lens jointing area or the bridge-to-lens jointing area of the lens may be triangular, hexagonal, or stellar. Then, the bolt must have a corresponding shape in cross section. In case that a fastening bolt or the shank of a joint section is inserted in the cylindrical plug which is press-fitted in the circular engagement aperture of the lens, the bolt or the shank of the joint section may have triangular, hexagonal, or stellar shape in cross section. FIG. 12 shows a stellar bolt 5 and a stellar engagement aperture 7 in the lens 6. FIG. 13 shows a stellar plug 9 to be fitted in the stellar engagement aperture 7 in the lens 6.

Figure 14:
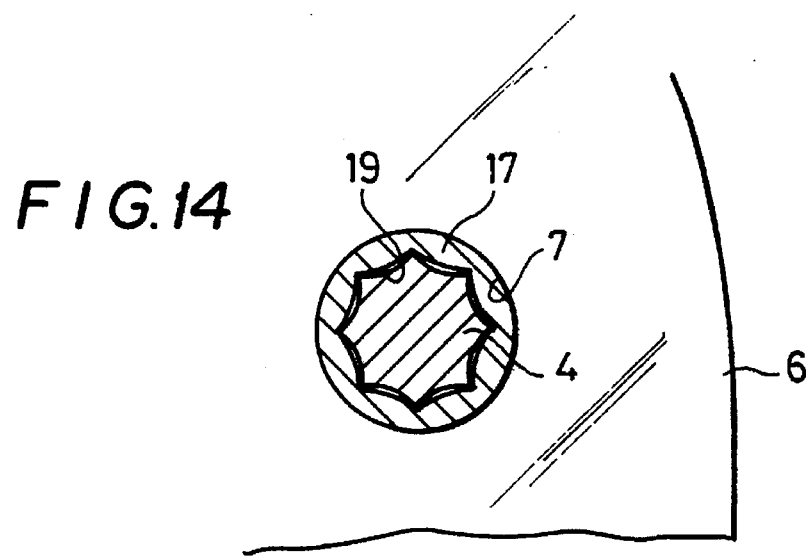
FIG. 14 is a cross-section showing how the cylindrical plug is deformed by the polygonal bolt when press-fitted therein.
Figure 15:
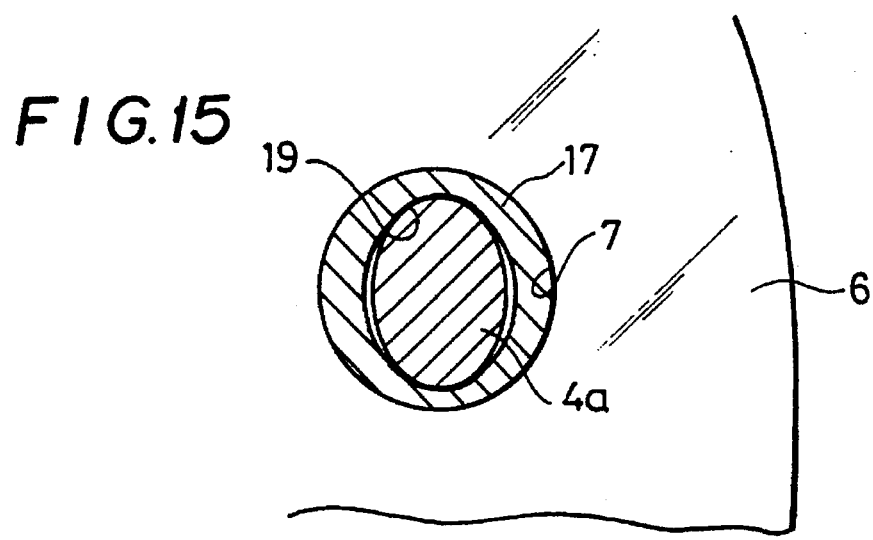
FIG. 15 is a cross-section showing how the cylindrical plug is deformed by the oval bolt when press-fitted therein.
Figure 16:
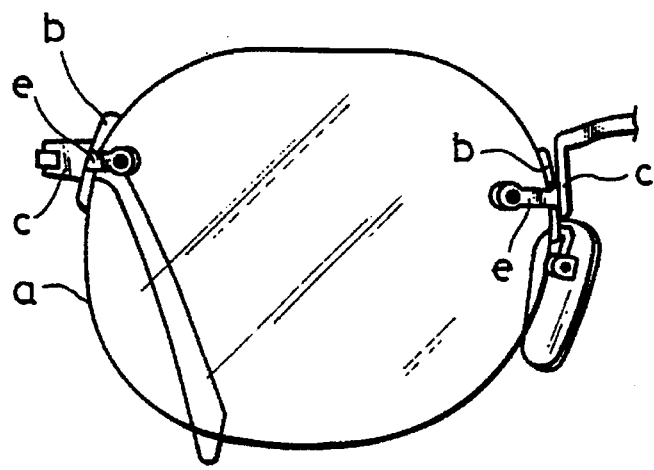
FIG. 16 shows conventional temple-to-lens and bridge-to-lens joint structures.
Figure 17:
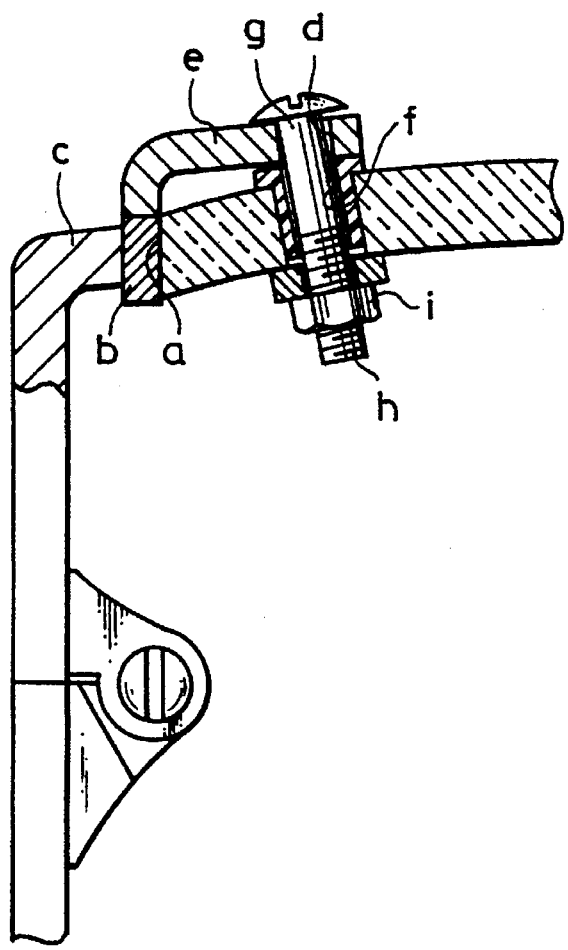
FIG. 17 shows, in section, how a temple is fixed to a lens by the conventional temple-to-lens joint structure.

FIG. 14 shows how the cylindrical plug 17 in the circular engagement aperture 7 is deformed by the stellar bolt 4 when press-fitted into the cylindrical plug 17. FIG. 15 shows how the cylindrical plug 17 in the circular engagement aperture 7 is deformed by an oval bolt 4a when press-fitted into the cylindrical plug 17.

As may be understood from the above, advantageously no soldering is required in making joint structures for connecting temples and bridges to lenses in frameless spectacles. Therefore, the productivity of frameless spectacles can be substantially improved. Thanks to no attachment piece to be fixed to a selected part of the circumference of the lens no stress can appear in the lens, and therefore the lens is advantageously guaranteed free from cracking caused by such stressing. No attachment pieces fixed to the lens circumference gives a pleasing appearance to frameless spectacles.

What is claimed is:

1. A lens joint structure of frameless spectacles for connecting a joint section to an associated lens comprising a bolt inserted in an engagement aperture of a joint section, and in an engagement aperture integrally formed in a lens jointing area of the lens to be tightened by an associated nut, the engagement apertures and the bolt having a non-circular shape such that relative rotation is prevented between the the engagement apertures through the corresponding peripheral shapes and the bolt.

2. A lens joint structure of frameless spectacles according to claim 1, wherein the non-circular engagement apertures have a quadrilateral shape; and the bolt has a head and a shank integrally connected to the head, at least the part of the shank extending in the engagement aperture of the joint section and lens having the same quadrilateral shape as the engagement aperture, and the remaining part of the shank having thread to engage with the nut on the side of the lens opposite to the side from which the bolt is inserted for fastening the joint section to the lens.

3. A lens joint structure of frameless spectacles according to claim 2, wherein a resin quadrilateral hollow plug is press-fitted in the quadrilateral engagement aperture of the lens; and the quadrilateral part of the shank of the bolt is inserted in the resin quadrilateral hollow plug from one side of the lens, and the thread of the shank of the bolt appearing on the other side of the lens is threadedly engaged with, and tightened by the nut for fastening the joint section to the lens.

4. A lens joint structure of frameless spectacles for connecting a joint section to an associated lens wherein the joint section has a shank integrally connected thereto, at least the part of the shank extending in a non-circular engagement aperture made in the lens jointing area of the lens, said shank having the same non-circular shape as the engagement aperture of the lens, and a remaining part of the shank having thread to engage with an associated nut on a side of the lens opposite to the one side from which the shank of the joint section is inserted for fastening the joint section to the lens.

5. A lens joint structure of frameless spectacles according to claim 4, wherein a resin non-circular hollow plug is press-fitted in the engagement aperture of the lens; and the non-circular part of the shank of the joint section is inserted in the resin hollow plug from one side of the lens, and the thread of the shank of the joint section appearing on the other side of the lens is threadedly engaged with the nut for fastening the joint section to the lens.

6. A lens joint structure of frameless spectacles for connecting a joint section to an associated lens comprising a bolt inserted in an engagement aperture of a joint section, and in an engagement aperture integrally formed in a lens jointing area of the lens to be tightened by an associated nut, wherein the engagement aperture of the lens is circular, and an initially-circular resin hollow plug is press-fitted in the circular engagement aperture of the lens; the engagement aperture of the joint section is non-circular; and the bolt has a head and a shank integrally connected to the head, at least a non-circular part of the shank extending in the non-circular engagement aperture of the joint section and the circular engagement aperture of the lens, said non-circular part of the shank having the same non-circular shape as the engagement aperture of the joint section, and the remaining part of the shank having thread to engage with the nut on the side of the lens opposite to the side from which the bolt is inserted for fastening the joint section to the lens, the press-fitting of the non-circular part of the bolt into the initially-circular plug causing the initially-circular plug to be yieldingly deformed by the non-circular shape of the shank of the bolt to invade the inner surface of the circular plug, whereby relative rotation is prevented.

7. A lens joint structure of frameless spectacles according to claim 6, wherein the head of the bolt has a transverse ridge extending thereacross.

8. A lens joint structure of frameless spectacles according to claim 6, wherein the head of the bolt has a pointing mark close to its circumference.

9. A lens joint structure of frameless spectacles for connecting a joint section to an associated lens wherein an engagement aperture made in the lens jointing area of the lens is circular, and a soft resin initially-circular hollow plug is press-fitted in the circular engagement aperture of the lens; the joint section has a shank integrally connected thereto, at least the part of the shank extending in the engagement aperture of the lens having a non-circular shape, and the remaining part of the shank having thread to engage with an associated nut on the side of the lens opposite to the side from which the shank of the joint section is inserted for fastening the joint section to the lens, the press-fitting of the non-circular part of the bolt into the initially-circular plug causing the initially-circular plug to be yielding deformed by allowing the non-circular shape of the shank of the bolt to invade the inner surface of the initially-circular plug whereby relative rotation between the joint section and the lens is prevented.

\* \* \* \* \*